(12) United States Patent
Chien et al.

(10) Patent No.: US 7,040,524 B2
(45) Date of Patent: May 9, 2006

(54) AUTOMATED PACKAGING APPARATUS AND METHOD OF OPTICAL ELEMENTS

(75) Inventors: Chih-Hsien Chien, Tainan (TW); Shean-Son Chiou, Taoyuan (TW); Chin-Yi Tsai, Yunlin (TW); Sung-Ho Liu, Kaohsiung (TW); Wen-Peng Tseng, Kaohsiung (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 130 days.

(21) Appl. No.: 10/745,528

(22) Filed: Dec. 29, 2003

(65) Prior Publication Data

US 2005/0139638 A1     Jun. 30, 2005

(30) Foreign Application Priority Data

Nov. 27, 2003   (TW) .............................. 92133451 A

(51) Int. Cl.
    *B23K 3/04*   (2006.01)

(52) U.S. Cl. .............................. 228/33; 228/48; 228/53

(58) Field of Classification Search .................. 228/33, 228/48, 53
See application file for complete search history.

(56) References Cited

U.S. PATENT DOCUMENTS

| | | | | |
|---|---|---|---|---|
| 3,828,156 A | * | 8/1974 | Fulks | 219/60 A |
| 4,223,201 A | * | 9/1980 | Peters et al. | 219/121.63 |
| 4,515,651 A | * | 5/1985 | MacLaughlin et al. | 156/423 |
| 5,295,700 A | * | 3/1994 | Crews et al. | 279/5 |
| 6,330,966 B1 | * | 12/2001 | Eissfeller | 228/8 |
| 6,336,582 B1 | * | 1/2002 | Kato et al. | 228/102 |
| 6,608,277 B1 | * | 8/2003 | Spooner et al. | 219/121.63 |

* cited by examiner

Primary Examiner—Jonathan Johnson
(74) Attorney, Agent, or Firm—Rabin & Berdo, P.C.

(57) ABSTRACT

An automatic packaging method of optical elements includes a focusing platform set, a Z-axis feeder set and an automatic feeding set. The Z-axis feeder set is provided above the focusing platform set. An automatic feeding set is arranged on a horizontal plane between the Z-axis feeder set and the focusing platform set by an appropriate distance. An upper part and a lower part of an optical element are supported by the lower end of the Z-axis feeder set and the upper end of the focusing platform set, respectively. The lower end of the Z-axis feeder set is adjusted vertically and horizontally with respect to the focusing platform set such that the upper part and the lower part are arranged in a line and coincide with each other. Afterward, by using the automatic feeding set, the upper part and the lower part of the optical element are bound together via the solders.

11 Claims, 6 Drawing Sheets

_US 7,040,524 B2_

AUTOMATED PACKAGING APPARATUS AND METHOD OF OPTICAL ELEMENTS

BACKGROUND OF THE INVENTION

1. Field of the Invention

This invention relates to an automatic packaging apparatus and an automatic packaging method of optical elements, and in particular, to an apparatus and a method capable of automatically performing a focusing operation and automatically performing a welding operation.

2. Description of the Prior Art

In the conventional processes, optical elements were packaged manually. The procedures associated with feeding, focusing, fixing and packaging operations are labor-intensive. Due to this limitation, high fabricating cost, low production and low yield adversely affect mass production of such optical elements and thus the development of their market scale is restricted.

According to the conventional processes, tin solders were used as binders between the internal tube and the external tube. A solder stick was manually melted on a welding iron head, and then dropwise adhered on the wall of the internal tube. Subsequently, fluxes were applied on the surface of the soldering points manually. Afterward, the soldering points were allowed to be in contact with the welding iron head and thus melted into a gap between the internal tube and the external tube so as to complete the bonding operation. However, during a time period from the procedure of applying the soldering points to the procedure of melting the soldering points, since the manual process fails to meet the requirement of simultaneous processing operation, the early applied soldering points may be shrunk. Therefore, the lower part has been focused may deviate from its original place such that the light loss is increased. In addition, after the bonding operation is completed, other gaps between the upper part and the lower part should be filled manually so as to meet the airtight requirement. Since the packaging process is cumbersome and less reproducible, the uncertainty of packaging the components is increased.

Accordingly, the above-described prior art product is not a perfect design and has still many disadvantages to be solved.

In views of the above-described disadvantages resulted from the conventional manually packaging process, the applicant keeps on carving unflaggingly to develop an automatic packaging apparatus and an automatic packaging method of optical elements according to the present invention through wholehearted experience and research.

SUMMARY OF THE INVENTION

An object of the invention is to provide an automatic packaging apparatus and an automatic packaging method of optical elements, which are capable of effectively solving the conventional manually packaging process. The time period required for performing the focusing operation can be shortened by using an automatic focusing platform. Furthermore, by means of an automatic solder-feeding unit, the solders are injected into a gap between components so as to minimize thermal strain. In such manner, the light loss resulted during the welding operation is reduced, and thus the performance of the components is enhanced. In addition, by controlling feeding amount of the solders and designing the components, the airtight requirement of the welding operation will be met, and thus the yield of the packaged components is increased and the artificial interference is avoided.

The above object of the present invention can be achieved by using an automatic packaging apparatus of optical elements. The apparatus comprises a focusing platform set, a Z-axis feeder set and an automatic feeding set. The Z-axis feeder set is provided above the focusing platform set by an appropriate level. An automatic feeding set is arranged on a horizontal plane between the Z-axis feeder set and the focusing platform set by an appropriate distance.

According to the above structure, an upper part and a lower part of an optical element are supported by the lower end of the Z-axis feeder set and the upper end of the focusing platform set, respectively. Then, the lower end of the Z-axis feeder set is adjusted vertically and horizontally with respect to the focusing platform set such that the upper part and the lower part are arranged in a line and coincide with each other. Afterward, by using the automatic feeding set, the solder is fed through a plurality of solder feeding holes arranged at regular intervals on a horizontal plane at the periphery of the lower part such that the upper part and the lower part of the optical element are bound together.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The configuration, usage and feature of the present invention will become apparent from the detailed description to follow taken in conjunction with the preferred embodiments and drawings.

Figure 3:
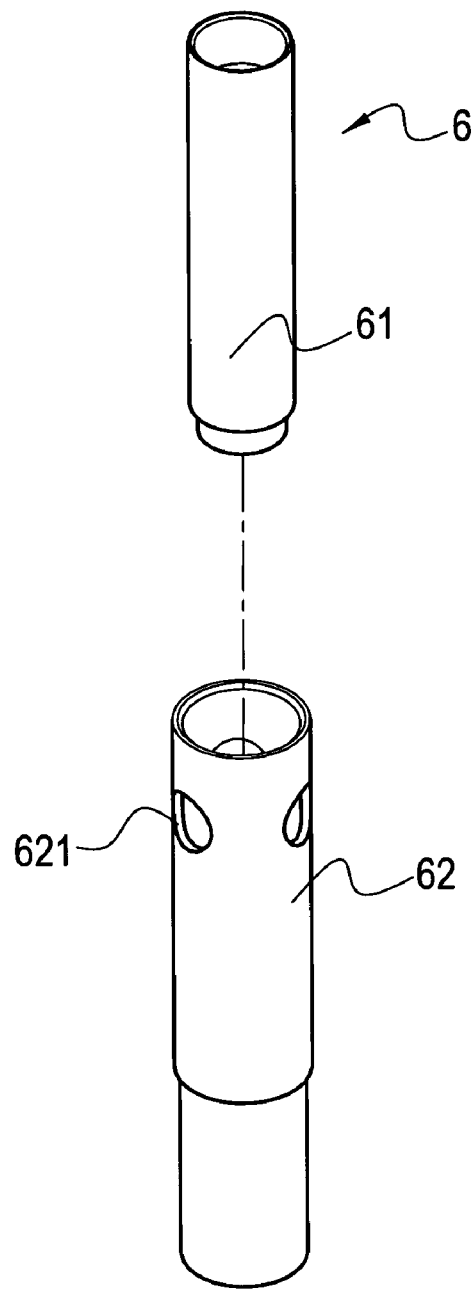
FIG. 3 is an exploded view of an optical element according to the present invention.

Referring to FIG. 3, the present invention is provided to package an upper part 61 and a lower part 62 of an optical element 6. Three solder feeding holes 521 are discretely arranged at regular intervals on a horizontal plane at the periphery of the lower part 62. The included angle between two adjacent holes 521 is 120°.

An automatic packaging apparatus of optical elements according to the present invention comprises a focusing platform set 1, a stud set 2, a Z-axis feeder set 3 and an automatic feeding set 4.

Figure 1:
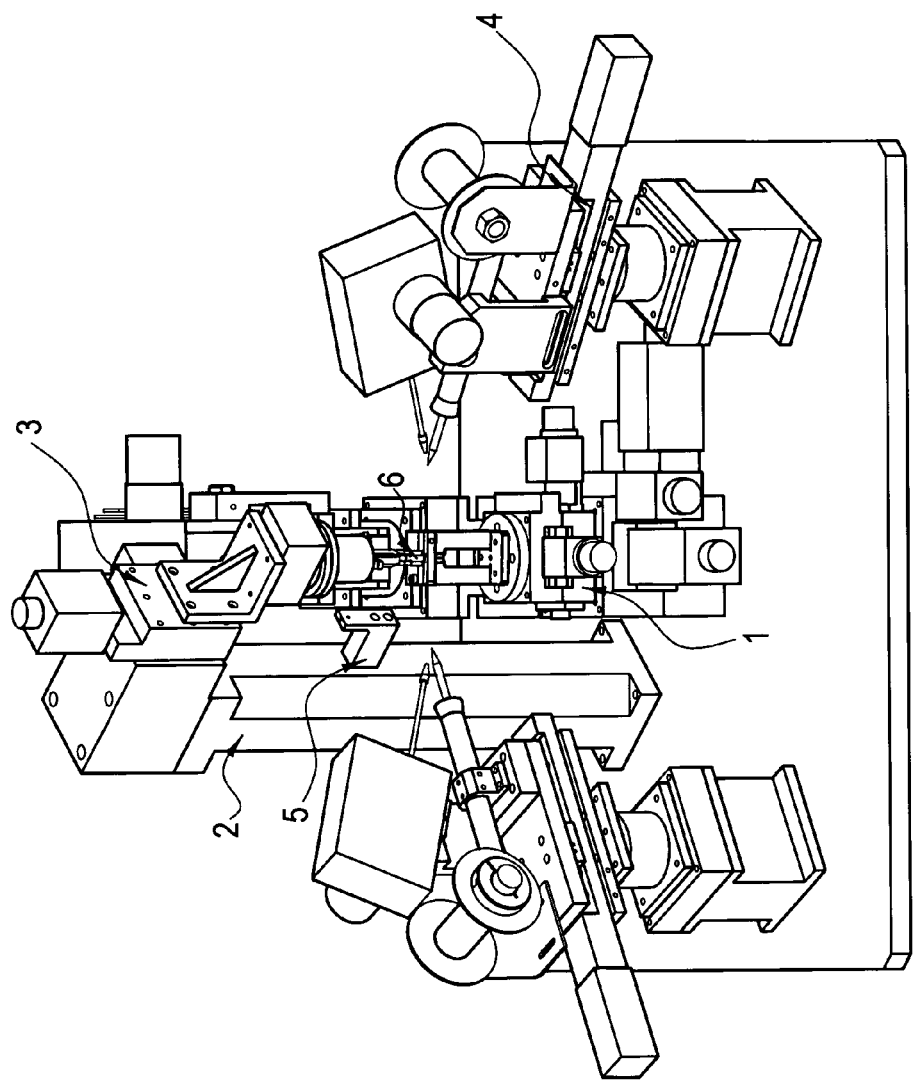
FIG. 1 is a perspective view of an apparatus according to the present invention.
Figure 2:
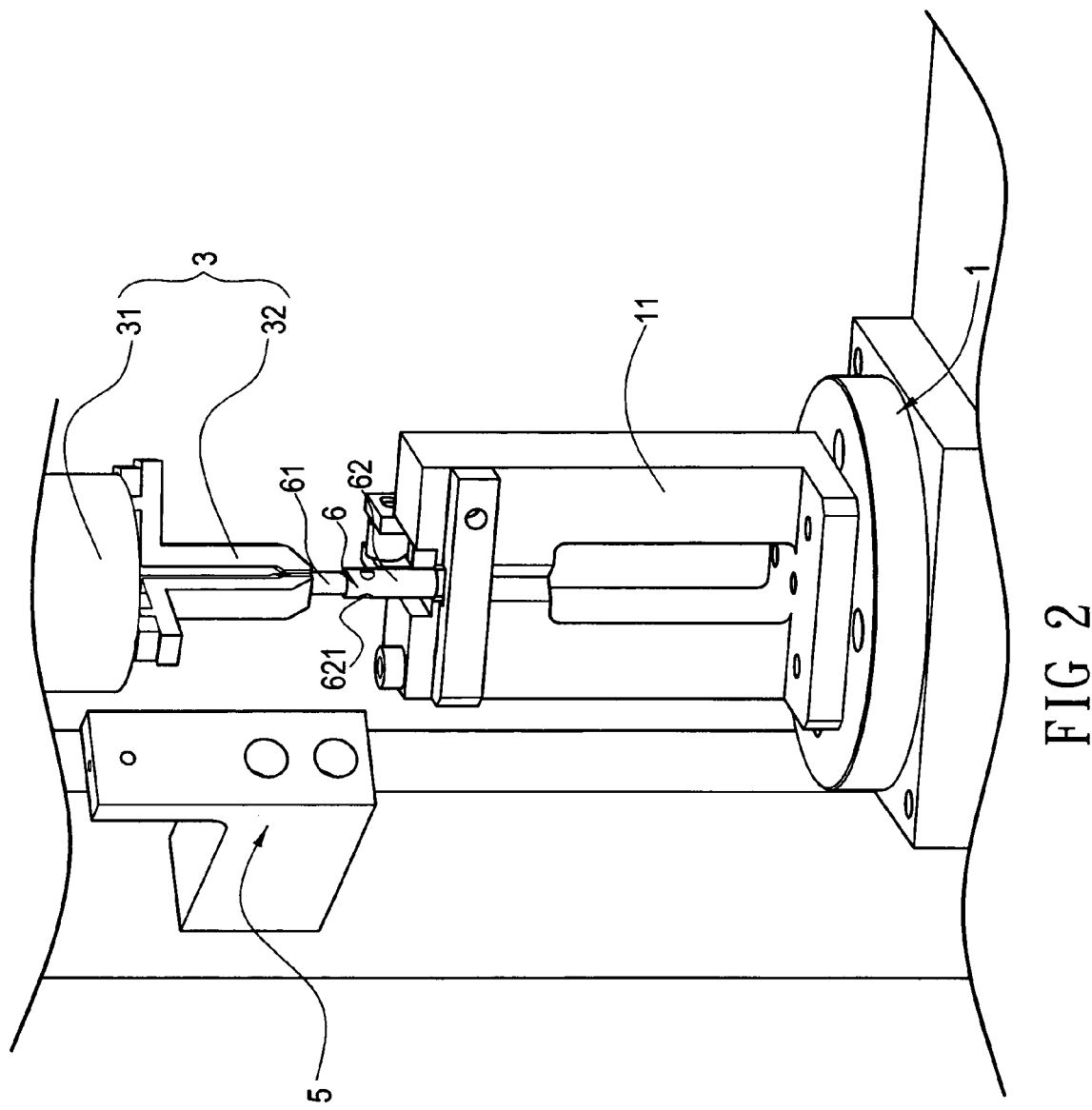
FIG. 2 is a schematic view illustrating an embodiment of the present invention.

The focusing platform set 1, as shown in FIGS. 1 and 2, is provided thereon with a clamping tool 11.

The stud set 2, as shown in FIG. 1, is optionally provided with a photoelectric sensor 5 at a suitable location thereof.

The Z-axis feeder set 3 is provided on the stud set 2, as shown in FIGS. 1 and 2. The Z-axis feeder set 3 is supported by the stud set 2 and arranged above the focusing platform set 1 by an appropriate level. The Z-axis feeder set 3 comprises essentially of an air pressure cylinder 31 and a two-claw driving,clamper 32 at the lower end of the air pressure cylinder 31.

Figure 4:
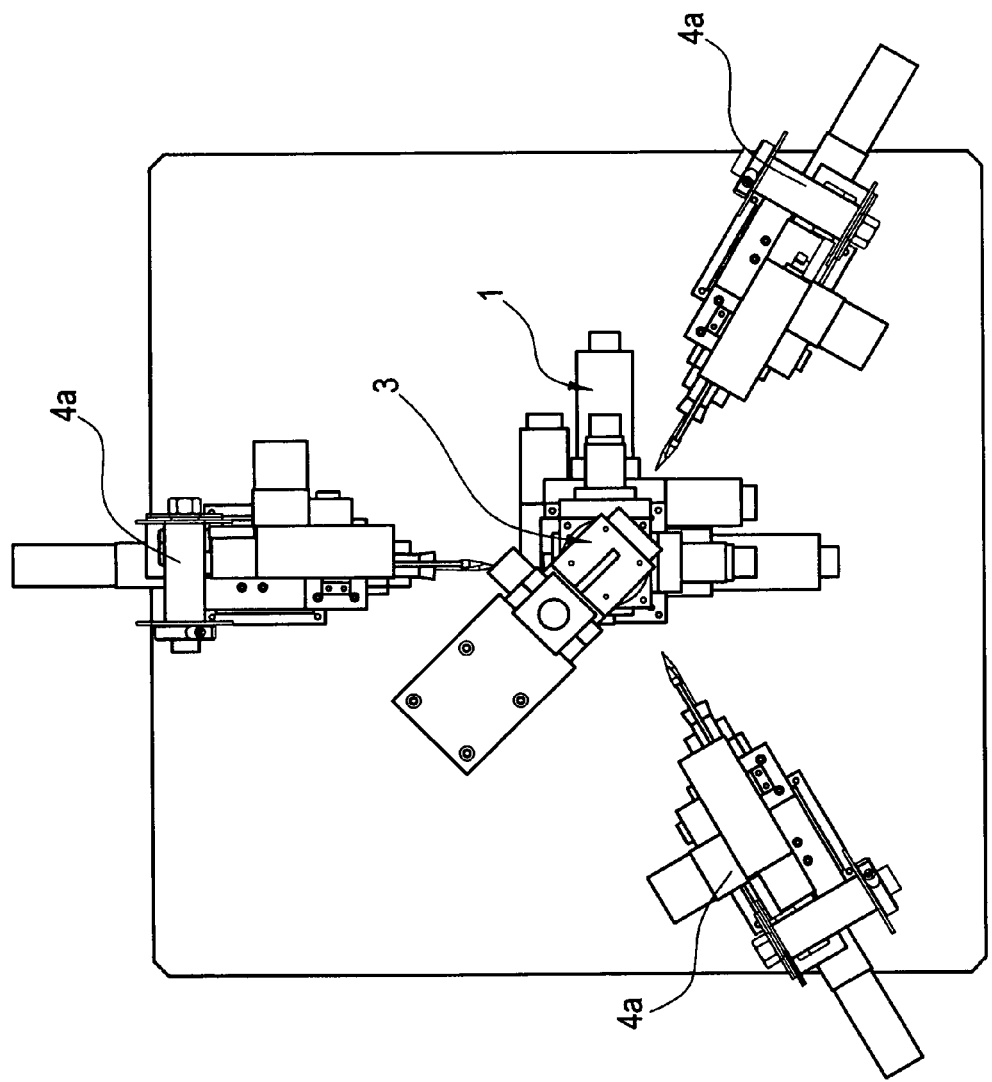
FIG. 4 is a top view of an automatic feeding set according to the present invention.
Figure 5:
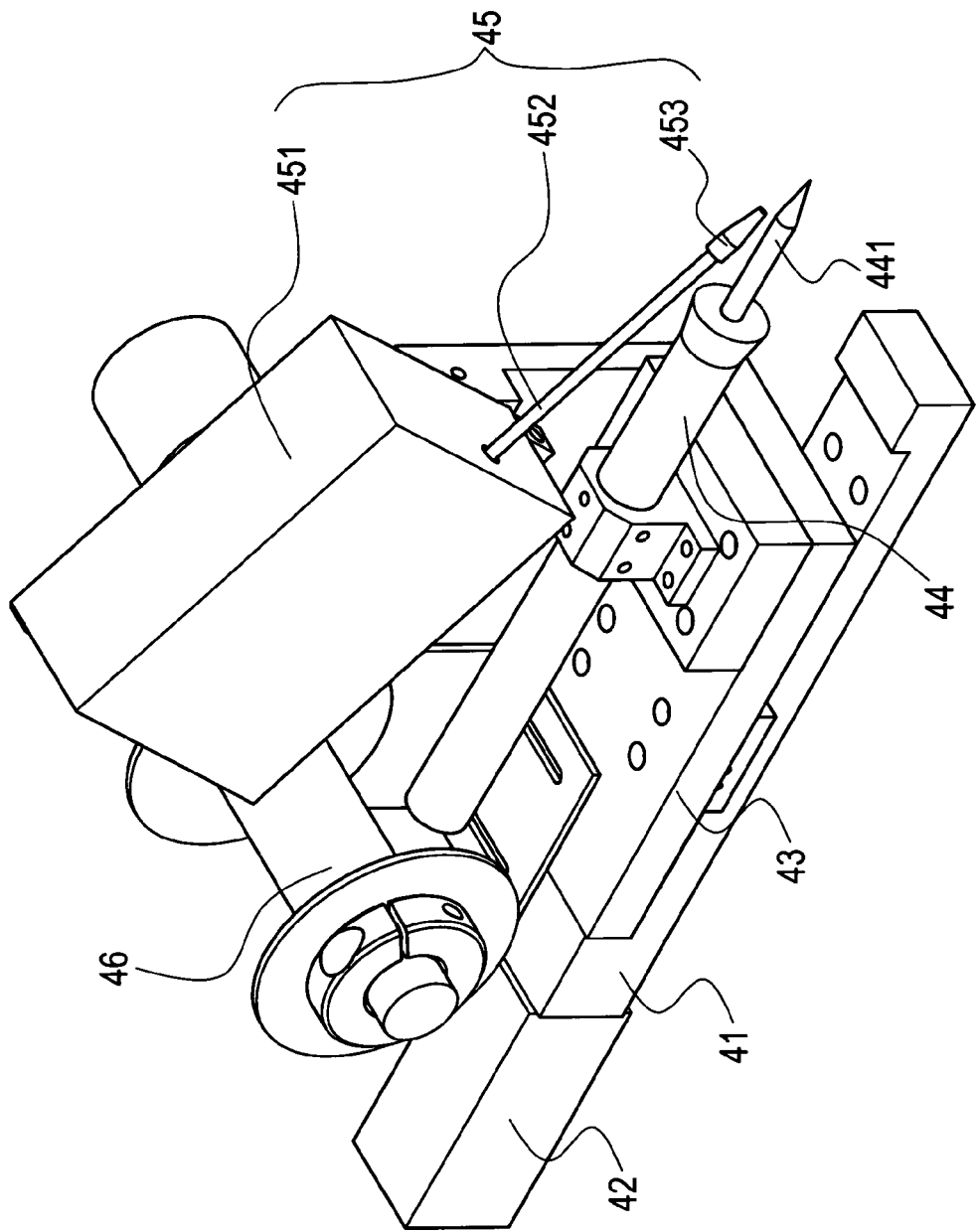
FIG. 5 is a perspective view of an automatic solder feeding mechanisms according to the present invention.
Figure 6:
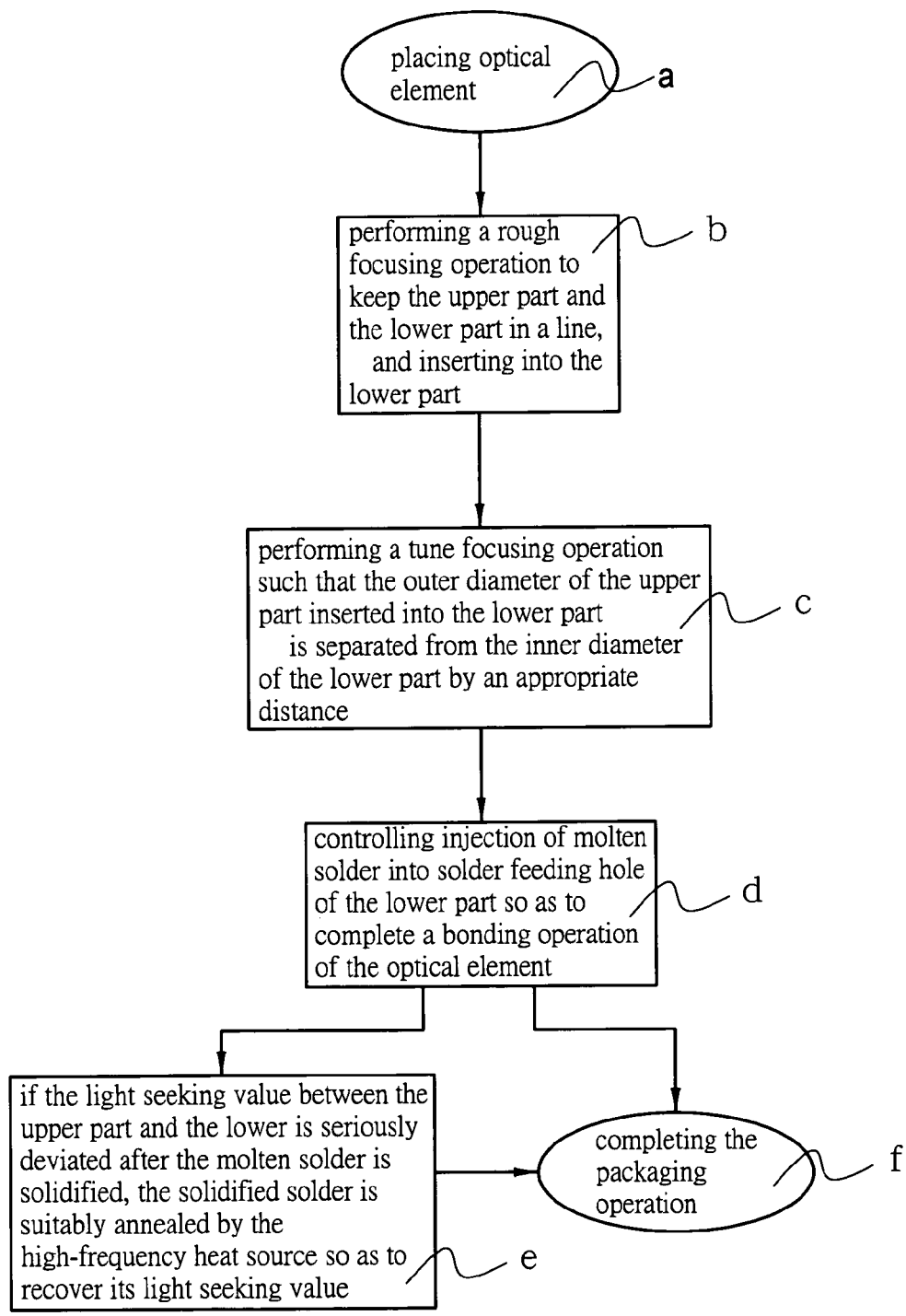
FIG. 6 is a flowchart illustrating a process of the present invention.

The automatic feeding set 4, as shown in FIGS. 1, 4 and 5, is arranged on a horizontal plane between the Z-axis feeder set 3 and the focusing platform set 1 by an appropriate distance. Corresponding to the three solder feeding holes 521 of the lower part 62 of the optical element 6, the automatic feeding set 4 comprises three automatic solder feeding mechanisms 4a, which are discretely arranged at regular intervals on the horizontal plane between the Z-axis feeder set 3 and the focusing platform set 1 by an appropriate distance. The included angle between two adjacent automatic solder feeding mechanisms 4a is 120°.

Each automatic solder feeding mechanism 4a comprises at least a feeding platform 41, a servo motor 42 and a gliding block transfer plate 43. The servo motor 42 is arranged at the rear end of the feeding platform 41. The gliding block transfer plate 43 is provided on the feeding platform 41 and will be driven by the servo motor 42 to move forward/backward to a retaining position. Furthermore, on the upper end of the gliding block transfer plate 43, there is provided a welding torch 44 and a solder feeding mechanism 45. The solder feeding mechanism 45 comprises essentially of a solder feeding unit 451, a solder conducting pipe 452 provided at the front end of the solder feeding unit 451, and a conducting pipe head 453 arranged at the terminal of the solder conducting pipe 452. The welding torch 44 is capable of emitting a high-frequency heat source for melting solders. The welding head 441 of the welding torch 44 is arranged along a linear path of the solder stick discharged from the conducting pipe head 453. Optionally, the gliding block transfer plate 43 is provided with a solder stick holder 46 to hold solder sticks in a bundle.

The above solder feeding unit 451 is used for precisely driving the solder sticks to move forward/backward into the solder conducting pipe 452. The solder sticks are then discharged from the welding head 441 of the welding torch 44.

The clamping tool 11, as shown in FIG. 2, is used for clamping the lower part 62. The clamping tool 11 can be horizontally moved with the movement of the focusing platform set 1.

By means of the driving damper 32 as shown in FIG. 2, the upper part 61 can be clamped and vertically moved according to the control of the air pressure cylinder 31.

The photoelectric sensor 5, as shown in FIGS. 2 and 3, is used for sensing the locations of the upper part 61 controlled by the Z-axis feeder set 3 so as to assure a constant depth of the upper part 61 coinciding with the lower part 62.

During the implementation of the above structure, the upper part 61 and the lower part 62 are clamped. As shown in FIGS. 1 and 2, the clamping tool 11 of the upper part 61 is clamped by the driving damper 32 of the air pressure cylinder 31. In addition to being supported by the shoulder portion in the middle, the lower part 62 is provided with additional clamping tools 11 arranged in predetermined directions because the relative locations between the three solder feeding holes 521 of the lower part 62 and the automatic feeding set 4 are fixed. The upper part 61 is not fixedly supported because a photoelectric sensor 5 is provided on the stud set 2 for measuring the location of the upper part 61 so as to assure a constant depth of the upper part 61 coinciding with the lower part 62.

Please refer to FIGS. 1, 2 and 5. The upper part 61 and the lower part 62 of the optical element 6 are supported by the lower end of the Z-axis feeder set 3 and the upper end of the focusing platform set 1, respectively. Then, the lower end of the Z-axis feeder set 3 is adjusted vertically and horizontally with respect to the focusing platform set 1 such that the upper part 61 and the lower part 62 are arranged in a line and coincide with each other. Afterward, by using the automatic feeding set 4, the solder is fed through the three solder feeding holes 521 of the lower part 62 such that the upper part 61 and the lower part 62 of the optical element 6 are bound together.

With reference to FIGS. 1, 2, 4, 5 and 6, the automatic packaging method of optical elements comprises the following steps:

Step a: placing the lower part 62 of the optical element 6 on the upper end of the focusing platform set 1, and holding the upper part 61 of the optical element 6 on the lower end of the Z-axis feeder set 3.

Step b: performing a rough focusing operation by using the Z-axis feeder set 3 to move the upper part 61 forward to an appropriate position with respect to the lower part 62, and using the focusing platform set to perform a shift adjusting operation along the horizontal axis X and the horizontal axis Y, as well as to perform a rotating operation along the rotation axis θX and the rotation axis θ so as to keep the upper part 61 and the lower part in a line, and then inserting the upper part 61 into the lower part 62 by moving the Z-axis feeder set 3 forward.

Step c: performing a tune focusing operation by the lower part 62 when the upper part 61 is inserted into the lower part 62 to a predetermined position, and using the focusing platform set to perform a shift adjusting operation along the horizontal axis X and the horizontal axis Y, as well as to perform a rotating operation along the rotation axis θX and the rotation axis θ, such that the outer diameter of the upper part 61 inserted into the lower part 62 is separated from the inner diameter of the lower part 62 by an appropriate distance.

Step d: starting the automatic feeding set 4 to feed the solder in a programmed manner so as to control amount and time of the molten solder fed, simultaneously injecting the solder into the three solder feeding holes 521 of the lower part 62 via the three automatic solder feeding mechanisms 4a, melting the solder to a molten state by the high-frequency heat source, and injecting into the gap between the upper part 61 and the lower part 62, thereby completing the bonding operation of the optical element 6.

Step f: completing the packaging operation.

Step e: if the light seeking value between the upper part 61 and the lower part 62 of the optical element is seriously deviated after the molten solder is solidified, the solidified solder can be suitably annealed by the high-frequency heat source, and then the upper part 61 and the lower part 62 are adjusted to recover its light seeking value.

Step f: completing the packaging operation.

Form the above embodiments, it is understood that the automatic packaging apparatus and the automatic packaging method provided by the present invention have the following advantages:

1. The included angle between two adjacent automatic solder feeding mechanisms 4a is 120°, and the solder feeding holes 521 of the optical element 6 has similar structure, i.e. the included angle between two adjacent solder feeding holes 521 is 120°. Since the optical element 6 is held on the stud set 2 and the focusing platform set 1, the solders fed from the three solder feeding holes 521 are in a stable equilibrium state.

2. The automatic feeding set 4 is characterized by the three automatic solder feeding mechanisms 4a, which can simultaneously feed solders via three solder feeding holes 521 and simultaneously solidify the solders. In addition, when the solders are in a molten liquid state, by means of the capillary attraction acting on the gap wall of the upper part 61 and the lower part 62, the solders can be filled with the gap after solidified so as to provide airtight effects. Comparing to the manual process requiring an additional whole ring welding operation, the apparatus of the present invention can be used to apply solders in the most effective and the most precise manner. In other words, after the three automatic solder feeding mechanisms 4a act simultaneously and apply solders simultaneously, the three soldering points are simultaneously solidified. Therefore, the thermal shift changes resulted from solidification are mutually balanced so as to minimize the light loss due to the shift change. Furthermore, Due to the capillary attraction acting on the gap wall of the bigger and the smaller tubes, the solders can be filled with the gap after solidified so as to provide airtight effects.

3. By means of the focusing platform set, the time period required to perform the focusing operation is shortened.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An automatic packaging apparatus of optical elements, comprising:
   a focusing platform set;
   a Z-axis feeder set arranged above said focusing platform set by a level;and
   an automatic feeding set arranged on a horizontal plane between said Z-axis feeder set and said focusing platform set by an appropriate distance;
   wherein an upper part and a lower part of an optical element are supported by the lower end of said Z-axis feeder set and the upper end of said focusing platform set, respectively, wherein the lower end of said Z-axis feeder set is adjusted vertically and horizontally with respect to said focusing platform set such that said upper part and said lower part are arranged in a line and coincide with each other, wherein by using said automatic feeding set, a solder is fed through a plurality of solder feeding holes arranged at regular intervals on a horizontal plane at the periphery of said lower part such that said upper part and said lower part of said optical element are bound;
   wherein said automatic feeding set comprises a plurality of automatic solder feeding mechanisms discretely arranged at regular intervals on a horizontal plane between said Z-axis feeder set and said focusing platform set by an appropriate distance;
   wherein said automatic solder feeding mechanism essentially of a feeding platform, a servo motor arranged at the rear end of said feeding platform and a gliding block transfer plate provided on said feeding platform, wherein said gliding block transfer plate is driven by said servo motor to move forward/backward to a retaining position, and a welding torch and a solder feeding mechanism are provided on the upper end of said gliding block transfer plate.

2. The automatic packaging apparatus of optical elements according to claim 1, optionally comprising a stud set for placing thereon said Z-axis feeder set and supporting said Z-axis feeder set.

3. The automatic packaging apparatus of optical elements according to claim 2, wherein said stud set is optionally provided with a photoelectric sensor at a suitable location thereof, the locations of said upper part controlled by said Z-axis feeder set being sensed by said photoelectric sensor so as to assure a constant depth of said upper part coinciding with said lower part.

4. The automatic packaging apparatus of optical elements according to claim 1, wherein said Z-axis feeder set comprises at least an air pressure cylinder and a driving damper at the lower end of said air pressure cylinder, said upper part being held and vertically moved by said driving clamper.

5. The automatic packaging apparatus of optical elements according to claim 4, wherein said driving damper comprises at least two claws.

6. The automatic packaging apparatus of optical elements according to claim 1, wherein said focusing platform set is optionally provided with a clamping tool for clamping said lower part and horizontally moved with the movement of said focusing platform set.

7. The automatic packaging apparatus of optical elements according to claim 1, wherein the number of said plurality of automatic solder feeding mechanisms correspond to the number of said plurality of solder feeding holes of said lower part.

8. The automatic packaging apparatus of optical elements according to claim 7, wherein the number of said plurality of automatic solder feeding mechanisms correspond to the number of said plurality of solder feeding holes of said lower part, said number being 3.

9. The automatic packaging apparatus of optical elements according to claim 8, wherein said three automatic solder feeding mechanisms are discretely arranged at regular intervals, and the included angle between two adjacent automatic solder feeding mechanisms is 120°.

10. The automatic packaging apparatus of optical elements according to claim 1, wherein said solder feeding mechanism comprises essentially of a solder feeding unit, a solder conducting pipe provided at the front end of said solder feeding unit, and a conducting pipe head arranged at the terminal of said solder conducting pipe, wherein said solder feeding unit precisely drives solder sticks to move forward/backward into said solder conducting pipe so as to discharge said solder sticks from said welding head of said welding torch.

11. The automatic packaging apparatus of optical elements according to claim 1, wherein said gliding block transfer plate is optionally provided with a solder stick holder 46 to hold solder sticks in a bundle.

* * * * *